May 22, 1962 R. K. VAN VECHTEN 3,035,748

TAPE TRANSPORTS

Filed Aug. 10, 1960 2 Sheets-Sheet 1

INVENTOR.
RICHARD K. VAN VECHTEN

BY Isidore Togut

ATTORNEY

TAPE TRANSPORTS

Filed Aug. 10, 1960 2 Sheets-Sheet 2

INVENTOR.
RICHARD K. VAN VECHTEN
BY [signature]
ATTORNEY

United States Patent Office 3,035,748 Patented May 22, 1962

3,035,748
TAPE TRANSPORTS

Richard K. Van Vechten, Clifton, N.J., assignor to International Telephone and Telegraph Corporation, Nutley, N.J., a corporation of Maryland Filed Aug. 10, 1960, Ser. No. 48,678
7 Claims. (Cl. 226—50)

This invention relates to tape transports for a magnetic recording and reproducing device and more particularly to means for preventing entanglements of the tape in such devices and is an improvement on pending application No. 746,580, filed July 2, 1958.

In magnetic tape recording devices, the tape is often driven by means of pressure rollers and rotating capstans. When the tape is moved at high speed, there is a tendency of the tape to adhere to the capstan which may result in the tape being entangled by the driving means with serious damage to the tape and loss of valuable data. This difficulty is experienced particularly with high speed bidirectional tape transports used in data storing and handling equipment where the tape movement is rapidly accelerated and decelerated and reversed.

The customary approach to preventing tape damage is to install a knife edge close to a smooth pinch roller to prevent wrap around and to act as a stripper. However, since the pinch roller must move through a travel distance in engaging the tape, such a stripper assembly can only be brought close to the surface and not in contact with the surface in order to allow for travel clearance. Jams, wrap arounds and damage to the tape are quite common because the tape can pass between the stripper and the pinch roller.

Other devices, using grooved rollers, have utilized finger guards which extend through the grooves in the rollers and guide the tape through the rollers. In tape which operates at high speeds, the continuous rubbing contact with such fingers is undesirable.

An object of this invention is to improve the tape transport equipment so that the tape can be manipulated rapidly and smoothly.

Another object of this invention is to reduce the extent of tape damage caused by tape wrapping around the pinch roller.

Still another object of this invention is to provide an automatic pinch roller skew correction means.

It is a feature of this invention to provide an improved pinch roller assembly in which the pinch roller contains a plurality of annular grooves. Finger guards are mounted so as to be disposed within the annular grooves and are shaped to the contours of the bases of the grooves so as to provide close cooperation with the grooves.

It is another feature of this invention to utilize finger guards which are arranged so that contact is made with the tape being transported only when the tape starts to wrap around the roller and is not made during normal operation.

It is a further feature of this invention to provide skew correction means by which the pressure of the pinch roller in operation automatically aligns the face of the pinch roller with the face of the capstan roller by causing the roller support to rotate about its support axis into proper alignment.

The above-mentioned and other features and objects of this invention will become more apparent by reference to the following description taken in conjunction with the accompanying drawings, in which.

Rapid start-stop operation involves accelerating the tape to velocities of about 100 inches per second in a quarter of a millisecond. Stopping and reversing operations take place at the same speeds with acceleration forces up to a thousand times the force of gravity being applied to the tape. Such rapid start-stop operation causes loops to be formed in the moving tape, somewhat in the manner of standing waves. The tape loops may be caught behind the spinning pinch roller and damaged, long lengths of intelligence impressed on the tape being lost in this manner. A principal cause of tape breakage is the catching of a loop behind the rotating pinch roller.

Figure 1:
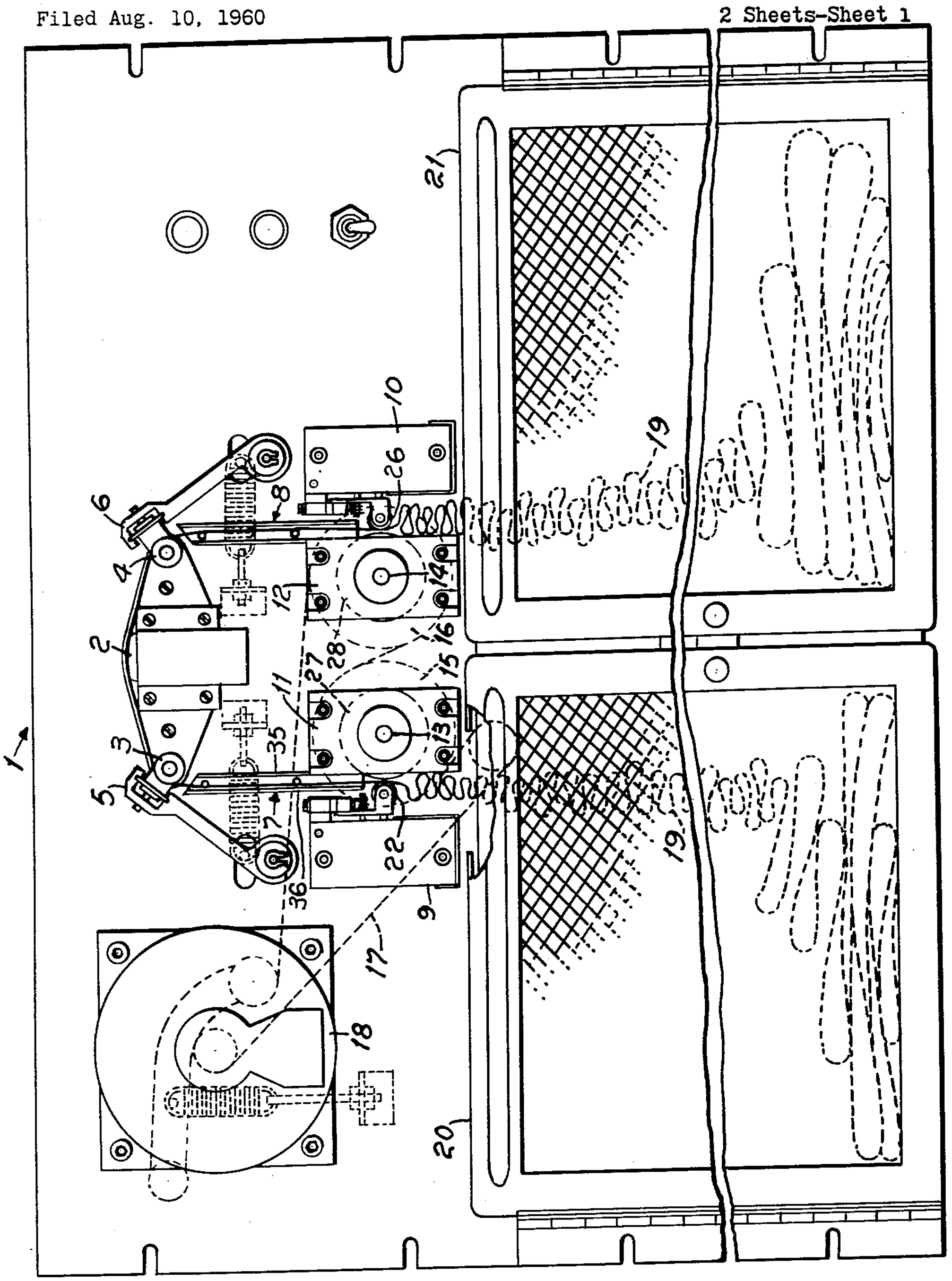
FIG. 1 is a front elevational view of a bidirectional tape transport incorporating this invention.

Referring to FIG. 1 of the drawing, the general arrangement of a tape transport is shown mounted on a case plate 1 and comprising assemblies symmetrically arranged about a recording-reproducing head 2 including guide posts 3 and 4, tension pads 5 and 6, guide channels 7 and 8 extending to the rollers of pinch roller assemblies 9 and 10, capstans 11 and 12 mounted on shafts 13 and 14, respectively, and extending through panel 1, equipped with pulleys 15 and 16 driven in opposite directions by belt 17 and motor 18. Magnetic tape 19 driven by capstans 11, 12 and pinch rollers 9, 10 is stored in loose folds in bins 20, 21.

Figures 2, 3:
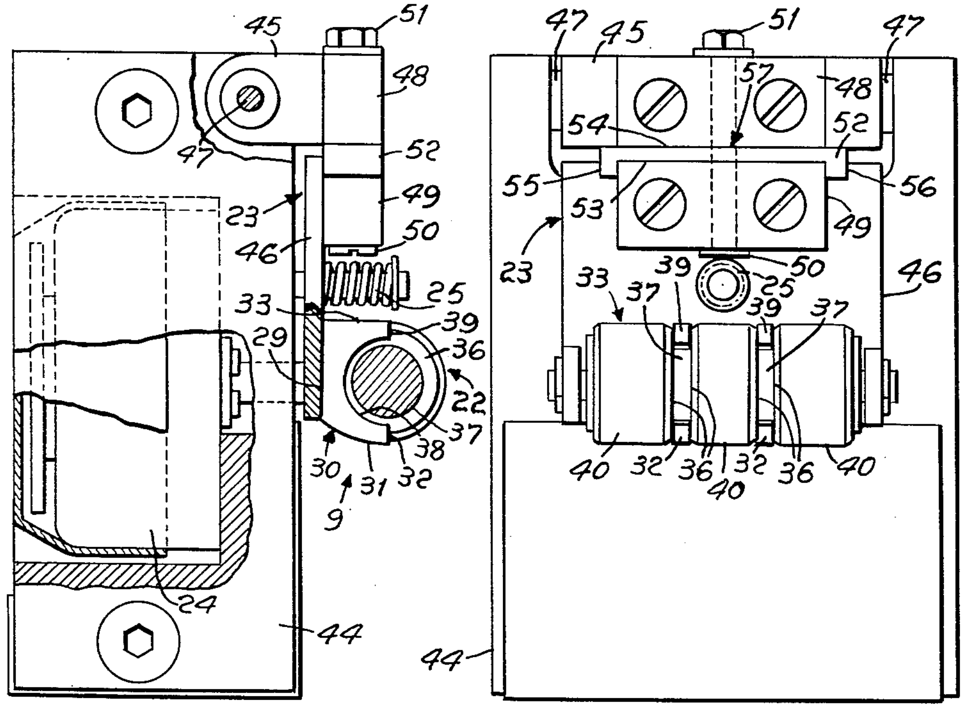
FIG. 2 is a side elevational view of the pinch roller assembly of the invention with skew correction means having a portion of the housing broken away to show the associated solenoid and finger guard.
FIG. 3 is a front elevational view of the pinch roller assembly.

A pinch roller assembly 9 is shown in FIGS. 2 and 3 comprising a pinch roller 22 mounted on an armature 23 activated by an actuator or solenoid 24. Spring 25 restores the roller to the non-operated condition.

In operation, the magnetic tape 19 is moved from one to the other of bins 20, 21 depending upon the direction of movement. This movement is accomplished by pressing tape 19 against either of the continually rotating capstan rollers 27, 28 by energizing one of the solenoid driven pinch rollers 22 and 26. Both the capstan rollers 27 and 28 are driven by the belt 17 which passes over pulleys 15, 16. Motor 18 used to drive the belt is a synchronous motor. When the left-hand pinch roller 22 is actuated, tape 19 is pressed against the corresponding capstan roller 27 which rotates counterclockwise causing the tape to be pulled across the magnetic head 2 out of the right-hand bin 21 and into the left-hand bin 20. The right-hand pinch roller 26 is de-energized for this direction of tape motion. To move the tape in the opposite direction, the right-hand pinch roller 26 is actuated while the left-hand pinch roller 22 remains de-energized.

Tape 19 is guided laterally by non-rotating guide posts 3 and 4 directly adjacent to the magnetic head 2 and is held in contact with the guide posts by the spring loaded pressure pads 5 and 6. The friction developed by the guide posts 3, 4 and pressure pads 5, 6 on the tape 19 provides the necessary tension in tape to keep it in intimate contact with the head 2. This same friction also serves to brake the tape 19 when both pinch rollers 22 and 26 are disengaged from the capstans 27 and 28.

The vertical guides 7, 8 serve to limit overtravel of tape 19 and to prevent the formation of tape loops between the non-driving capstan and its associated guide post when tape travel is stopped or reversed.

Referring to FIGS. 2 and 3, the flat base 29 of a guard member 30 is mounted on armature unit 23. The edge 31 is curved from its junction with base 29 to the edge 32 forming an arc from the periphery of the pinch roller 22 to the edge of the armature plate 46. The edge 33 of the guard member 30 does not extend beyond the pinch roller periphery 40 except between the armature unit 23 and the midpoint of the pinch roller 22. The guard member 30 is disposed within annular grooves 34 in pinch roller 22. The annular grooves 32 consists of side walls 36 and groove base 37. The concave curvature 38 of finger guard member 30 is of slightly larger diameter than the diameter of the pinch roller groove base 37 and concentric therewith. The flat extremities 32 and 39 of the guard member 30 extend to about the center of pinch roller 33.

In operation, the clearance between the curve 38 and base 37 permits the pinch roller to turn freely, but sides 31 and 33 of the guard member 30 prevent tape from wrapping around the pinch roller 22. Also, the tape does not contact the guard member 30 except when the tape protrudes beyond the center of the pinch roller 22 and wrap around is prevented by the guard member. Further, the shape of the finger guard prevents the tape from rubbing against the fingers during normal operation and thus prevents damage to the tape due to such rubbing contact.

Figure 4:
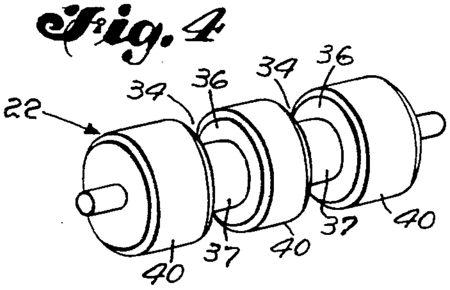
FIG. 4 is a perspective view of the pinch roller.

FIG. 4 shows the pinch roller 22 removed from its mounting and shows the relationship of the annular grooves 34, the groove walls 36, the groove base 37 and the pinch roller periphery 40.

Figure 5:
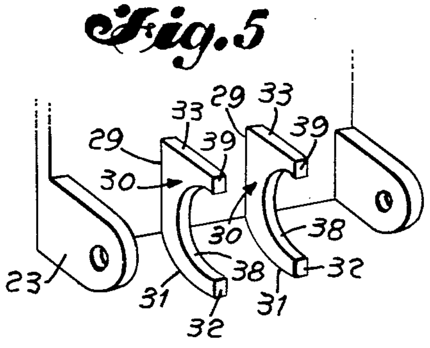
FIG. 5 is a perspective view of the armature unit with one embodiment of the finger guard.

FIG. 5 shows the guard members 30 mounted on armature unit 23 by their bases 29 and shows the construction of the sides 31, 33 and the concave side 38 with extremities 32 and 39.

Figure 6:
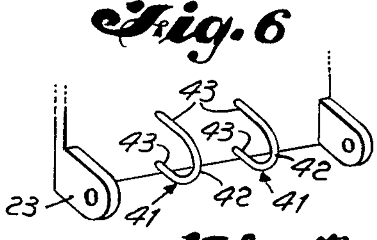
FIG. 6 is a perspective view of the armature unit with a second embodiment of the finger guard.

FIG. 6 shows an alternate embodiment of the guard member. In this instance, the guard member 41 consists of a relatively stiff wire, having a U-shaped form, the circular root 42 thereof being of slightly larger diameter than the annular groove base 37 with which it is to be associated and is concentric therewith. The side portions 43 of the U-shaped guard member 41 are straight and extend to the armature unit 23 where they are attached.

Figure 7:
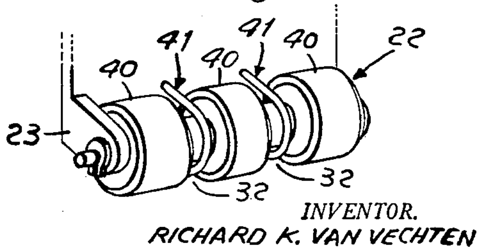
FIG. 7 is a perspective view of the armature unit with the second embodiment of the finger guard and pinch roller assembled.

FIG. 7 shows the assembly of the alternate embodiment with the pinch roller 22 in place. The pinch roller 22 is mounted on armature unit 23 and the guard members 41 are also mounted on the armature unit 23 and disposed within the annular grooves 34 of the pinch roller. The guard members 41 do not extend beyond the cylindrical periphal surface 40 of the pinch roller 22 which cooperates with the capstan roller 27.

In operation, the pinch roller 22 is free to turn within the finger guards 41, but the tape is prevented from wrapping around the roller by the side portions 43 of the guard members 41.

In addition to the improvements in the tape transport described above, there is provided another improvement in the pinch roller assembly to automatically align the pinch roller with respect to the capstan roller during assembly.

A skew adjustment improvement is shown in FIGS. 2 and 3 to accomplish the automatic alignment of the pinch roller with the capstan roller. The housing 44 accommodates at one end the armature unit 23. The armature unit 23 is composed of a support member 45 and a plate 46. The support member 45 is connected to the housing 44 by shaft 47 about which the support member 45 is free to turn. A bar 48 is attached to the support member 45. Another bar 49 is attached to the plate 46. Bars 48 and 49 are connected by a screw 50 and nut 51. A spacer 52 preferably of plastic material is disposed between bar 48 and 49 and the three members are coupled together by a screw 50 and nut 51. The bolt 50 can be adjustably tensioned by the nut 51 to permit a limited movement of bar 49 and spacer 52 relative the bar 48. Should the cylindrical peripheral surface 40 of the pinch roller 22 be misaligned with relation to the corresponding cylindrical surface of the capstan roller 27, the pressure of the solenoid 24 when activated will cause the one side of the pinch roller to have a greater force applied to it than the other side when it contacts the capstan roller. The force applied by the solenoid will cause the pinch roller 22, armature plate 46 and the bar 49 to rotate about the axis of the bolt 50 as long as the force applied by the solenoid is greater than the friction between the surfaces 53 and 54 of the spacer 52 and the bars 48 and 49. To retain the spacer 52 substantially integral with the bar 49, spacer 52 is made U-shaped, with two short sides 55 and 56 connected by a long side 57. The bar 49 is closely fitted into the recess formed by the long side 57 and the short sides 55 and 56. Thus, the spacer 52 will move together with the bar 49. In operation, then, there is an automatic skew correcting adjustment of the pinch roller 22 relative to the capstan roller 27 to correct any deviation in the parallelism of the cooperating surfaces of the pinch roller and the capstan roller.

The invention has been described in relation to bidirectional tape drive. It is obvious, however, that the invention may be used for various driving devices including unidirectional tape drives.

While the principles of the invention have been described in connection with specific embodiments, and particular modifications thereof, it is to be clearly understood that this description is made only by way of example and not as a limitation to the scope of the invention as set forth in the objects thereof and in the accompanying claims.

I claim:

1. In a tape transport including two capstan rollers for rapidly transporting magnetic tape in either of two directions, a separate pinch roller cooperating with each capstan roller and a separate actuator for selectively moving each pinch roller relative to its cooperating capstan roller for contact engagement therewith, the improvement in said tape transport comprising a guard member disposed adjacent each said pinch roller in cooperative relation thereto and spaced from the magnetic tape during normal movement thereof, and skew correction means to correct any deviation in the parallelism of the cooperating surfaces of each said pinch roller and its cooperating capstan roller.

2. In a tape transport according to claim 1 wherein each said pinch roller has at least one annular groove in said pinch roller, a portion of said guard member being disposed within the walls of said annular groove adjacent the annular base of said groove, the adjacent surface of said guard member being curved to correspond to the curvature of said annular base.

3. In a tape transport according to claim 2 wherein said guard member further comprises a flat member having a thickness less than the width of said annular groove, said member comprising a concave side corresponding to the curvature of said annular base, a curved side, a portion of said curved side corresponding with the curvature of the periphery of said pinch roller, a first straight side opposite said curved side, a second straight side normal to said first straight side and connecting said first straight side with said curved side, and third and fourth straight sides connecting said concave side to said first straight side and said curved side.

4. A tape transport according to claim 2 wherein said guard member comprises a wire loop and said wire loop comprises a curved portion corresponding to the curvature of said annular base and first and second straight portions connected to opposite ends of said curved portion to constitute a substantially U-shaped loop, said curved portion being disposed within the walls of said annular groove adjacent the base of said groove.

5. In a tape transport including two capstan rollers for rapidly transporting magnetic tape in either of two directions, a separate pinch roller cooperating with each capstan roller, and a separate actuator for selectively moving each pinch roller relative to said capstan roller for contact engagement therewith, the improvement in said tape transport comprising skew correction means to correct any deviation in the parallelism of the cooperating surfaces of each said pinch roller and said capstan roller, said skew correction means comprising an armature plate, means disposing said armature plate adjacent said actuator, means disposing said pinch roller on said armature plate for rotation about a first axis parallel with the axis of said capstan roller, a support member, means disposing said support member for rotation about an axis parallel with the axis of said pinch roller, means coupling said amature plate to said support member whereby said armature plate when urged by said solenoid armature will move integrally with said support member about the axis of said support member and will move relative said support member about a second axis perpendicular to said first axis.

6. In a tape transport including two capstan rollers for rapidly transporting magnetic tape in either of two directions, a separate pinch roller cooperating with each said capstan roller, and a separate actuator for selectively moving each pinch roller relative to its cooperating capstan roller for contact engagement therewith, the improvement in said tape transport comprising skew correction means to correct any deviation in the parallelism of the cooperating surfaces of each said pinch roller and its cooperating capstan roller, said skew correction means comprising an armature plate, means disposing said armature plate adjacent the armature of said actuator, means disposing said pinch roller on said armature plate for rotation about a first axis parallel with the axis of said capstan roller, a support member, means disposing said support member for rotation about an axis parallel with the axis of said pinch roller, a first member coupled to the end of said armature plate opposite said pinch roller, a second member coupled to said support member, a spacer disposed between said first and second members, a threaded member coupling said first and second members and said spacer together with said spacer, the axis of said threaded member being perpendicular to said first axis, and means to vary the compressive force of said first and second members against said spacer, whereby said armature plate when urged by said actuator will move integrally with said support member about the axis of said support member and will move relative said support member about the axis of said threaded member when any deviation exists between the parallelism of the cooperating surfaces of said pinch roller and said capstan roller.

7. In a tape transport according to claim 6 wherein said spacer comprises a flat member having a recess on one side to receive said first member therein, the side of said flat member opposite said recess being in contact relation with said second member whereby said spacer will move integrally with said first member in any movement of said armature plate and said first member relative said support member and said second member.

References Cited in the file of this patent

UNITED STATES PATENTS

| | | |
|---|---|---|
| 2,348,355 | Miller | May 9, 1944 |
| 2,614,374 | Hall | Oct. 21, 1952 |
| 2,828,123 | Guillemette | Mar. 25, 1958 |
| 2,914,752 | MacDonald | Nov. 24, 1959 |